(12) United States Patent
Sahm et al.

(10) Patent No.: US 7,971,328 B2
(45) Date of Patent: Jul. 5, 2011

(54) TOOL REVOLVER

(75) Inventors: Detlef Sahm, Reichenbach/Fils (DE);
Dietmar Linder, Riederich (DE);
Jochen Dieringer, Hechingen-Stetten (DE)

(73) Assignee: Sauter Feinmechanik GmbH, Metzingen (DE)

( * ) Notice: Subject to any disclaimer, the term of this patent is extended or adjusted under 35 U.S.C. 154(b) by 697 days.

(21) Appl. No.: 11/921,302

(22) PCT Filed: Apr. 21, 2006

(86) PCT No.: PCT/EP2006/003667
§ 371 (c)(1),
(2), (4) Date: Nov. 30, 2007

(87) PCT Pub. No.: WO2007/009515
PCT Pub. Date: Jan. 25, 2007

(65) Prior Publication Data
US 2010/0029451 A1    Feb. 4, 2010

(30) Foreign Application Priority Data
Jul. 20, 2005   (DE) .......................... 10 2005 033 890

(51) Int. Cl.
*B23Q 5/04*       (2006.01)
*B23B 39/20*      (2006.01)
(52) U.S. Cl. ................ 29/40; 29/42; 29/48.5 A; 74/814; 74/813 L
(58) Field of Classification Search ................ 29/40, 39, 29/42, 48.5 R, 48.5 A; 408/35; 74/813 R, 74/814, 813 L
See application file for complete search history.

(56) References Cited

U.S. PATENT DOCUMENTS

| 3,023,677 | A  | * | 3/1962  | Charlat ........................... 408/35 |
| 5,455,993 | A  |   | 10/1995 | Link et al. |
| 6,704,983 | B2 |   | 3/2004  | Matsumoto |
| 2001/0039705 | A1 | * | 11/2001 | Forst et al. ........................ 29/40 |
| 2003/0046799 | A1 |   | 3/2003  | Matsumoto |

FOREIGN PATENT DOCUMENTS

| DE | 39 29 136    | 4/1991 |
| FR | 2 526 342    | 11/1983 |
| JP | 61038806     | 2/1986 |
| JP | 2001-341009  | 12/2001 |
| WO | WO 97/43069  | 11/1997 |

* cited by examiner

*Primary Examiner* — Erica E Cadugan
(74) *Attorney, Agent, or Firm* — Roylance, Abrams, Berdo & Goodman, LLP

(57) ABSTRACT

A sealing arrangement (41) sealing the inside (15) of the tool disk (3) in relation to the outer side on the respective tool station is provided on each drive part (25) in a tool revolver. The tool driver a base body (1) applied or to be applied to the tool machine and defining a revolver axis (7) about which a tool disk (3) is rotationally mounted on the base body (1). The tool disk has a plurality of tool stations (17) distributed on its periphery and adjustable by rotating to tool disk (3) in respectively at least one working position. A tool drive (19) located in the inside of the tool disk (3) and applied to the base body (1) is coupled to the drive-sided coupling part (23). The coupling part includes a tool-sided coupling part for the drive of a tool located on the tool station (17) oriented towards the work station. A drive part (25) forming the tool-sided coupling part, is rotationally mounted in each tool station (17), with the tool receiving element (53) of the respective tool, being operable on the tool station, can be applied to the drive connection.

11 Claims, 3 Drawing Sheets

TOOL REVOLVER

FIELD OF THE INVENTION

The invention relates to a tool revolver with a base body to be mounted or is mounted on a tool machine and defining a revolver axis around which a tool disk is rotatably mounted on the base body. The tool disk has several tool stations distributed on its periphery and adjustable in each case in at least one working position by the rotation of the tool disk. A tool drive is located inside the tool disk, is mounted on-the base body, and is coupled by its drive-side coupling part to a tool-side coupling part for driving a tool. The tool is located on the tool station oriented towards the working position.

BACKGROUND OF THE INVENTION

Tool revolvers of this type are known in the prior art. U.S. Pat. No. 6,704,983 B2 shows a tool revolver of this type intended for use in turning lathes, in machining centers and in similar devices such as machine tools.

When using such tool revolvers, the tools located at the tool stations of the revolver head, which are to be used, are mainly tools for machining, such as drilling, lathing or milling tools. For adjusting to the respective machining task, the tools are interchanged by the machine operator. In such machining processes, auxiliary media, in particular in the form of cooling lubricants, are usually used. In theory, the danger exists that the respective cooling lubricants, together with the chips that are produced in machining, enter the interior of the tool disk, potentially destroying the tool drive located therein. The potential applies in particular if the chips or other dirt and abrasion particles are entrained by the penetrating fluid and enter the tool drive located inside the tool disk.

SUMMARY OF THE INVENTION

An object of the invention is to provide a tool revolver that is effectively protected from fluids and chips entering into the interior of the tool disk.

This object is basically achieved by a tool revolver having, in each tool station of the tool disk, a rotatably mounted drive part, via which the drive connection is made between the drive-side coupling part of the inner tool drive and the respective tool receptacle in the working position with its tool to be operated. Since a sealing arrangement sealing the interior of the tool disk relative to the exterior at each tool station is also provided on each drive part, the entire exterior of the tool disk is secured against fluid leaks and penetration of chips. The seal is effective at each tool station because each tool station is provided with a drive part that performs the dual function both as a drive-intermediate element and as a sealing element. Sealing of the tool disk is also ensured when a tool receptacle is not located at each tool station.

In advantageous embodiments of the invention, the drive parts are configured such that they form a rotational element with a circular cylindrical periphery over a majority of their axial lengths and have at least one flat bearing surface in their peripheral section on the end-side that is adjacent to the drive-side inner coupling part. This coupling part forms the component of an anti-rotation device securing the rotational position of the drive part as the tool disk rotates. The presence of an anti-rotation device securing the rotational position of the drive part as the tool disk rotates ensures that, as the tool disk rotates and a tool station moves into the working position, trouble-free engagement can take place between the drive part and the inner, drive-side coupling part.

By preference, the sealing arrangement sealing the interior of the tool disk against the exterior at each tool station by interaction with the drive part is provided on the outer circular-cylindrical end area of the drive part adjacent to the outer periphery of the tool disk. Advantageously, for this purpose, a shaft seal, for example in the form of a tangent radial shaft seal, can be provided.

A diametrical through groove, which is open on the end of the drive part that is turned toward the interior of the tool disk and whose flat side walls form planes that are parallel to at least one bearing surface, can be provided on the respective drive part as a tool-side, in particular a revolver-side, coupling part.

Since the bearing surface on the drive parts can form a component of an anti-rotation device securing the rotational position of the drive part as the tool disk rotates, the possibility exists to adjust the drive part before the tool disk rotates in such a rotational position that the longitudinal axis of the groove is oriented in the direction of the path of travel during rotation. The coupling connection can then be made by inserting the drive-side coupling part of the tool drive, located inside the tool disk, into the groove. For this purpose, a drive pin with a rectangular outline, which can be suitably accommodated in the groove of the drive part and can be moved through the groove with rotations of the tool disk, can be provided as a drive-side coupling part of the inner tool drive.

The anti-rotation device for the drive parts can have a guide element forming a path of travel extending concentrically to the revolver axis between the tool stations. The path of travel extends along the path of travel traversed by the respective drive part as the tool disk rotates and along which the respective bearing surface of the drive part is guided in abutment as the tool disk rotates.

With the drive part in such a rotational position, each drive pin of the inner tool drive can smoothly enter the groove of the respective drive part entering into the working position. Before introducing a rotary motion of the tool disk, the drive pin of the inner tool drive must be brought into a rotational position in which the side walls of the groove of the drive part coupled to the drive pin and the respective bearing surface of the drive part are in planes that are parallel to the path of travel.

If the tool drive inside the tool disk is an electric motor, its rotor shaft is concentric to the respective drive part of the tool station that is in the working position. It forms the drive pin on its shaft end. An electric motor making it possible to determine an electric rotational position of the rotor and thus the drive pin, can be used. In addition, the possibility exists of effecting a rotational position for determining the rotor via corresponding sensors.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
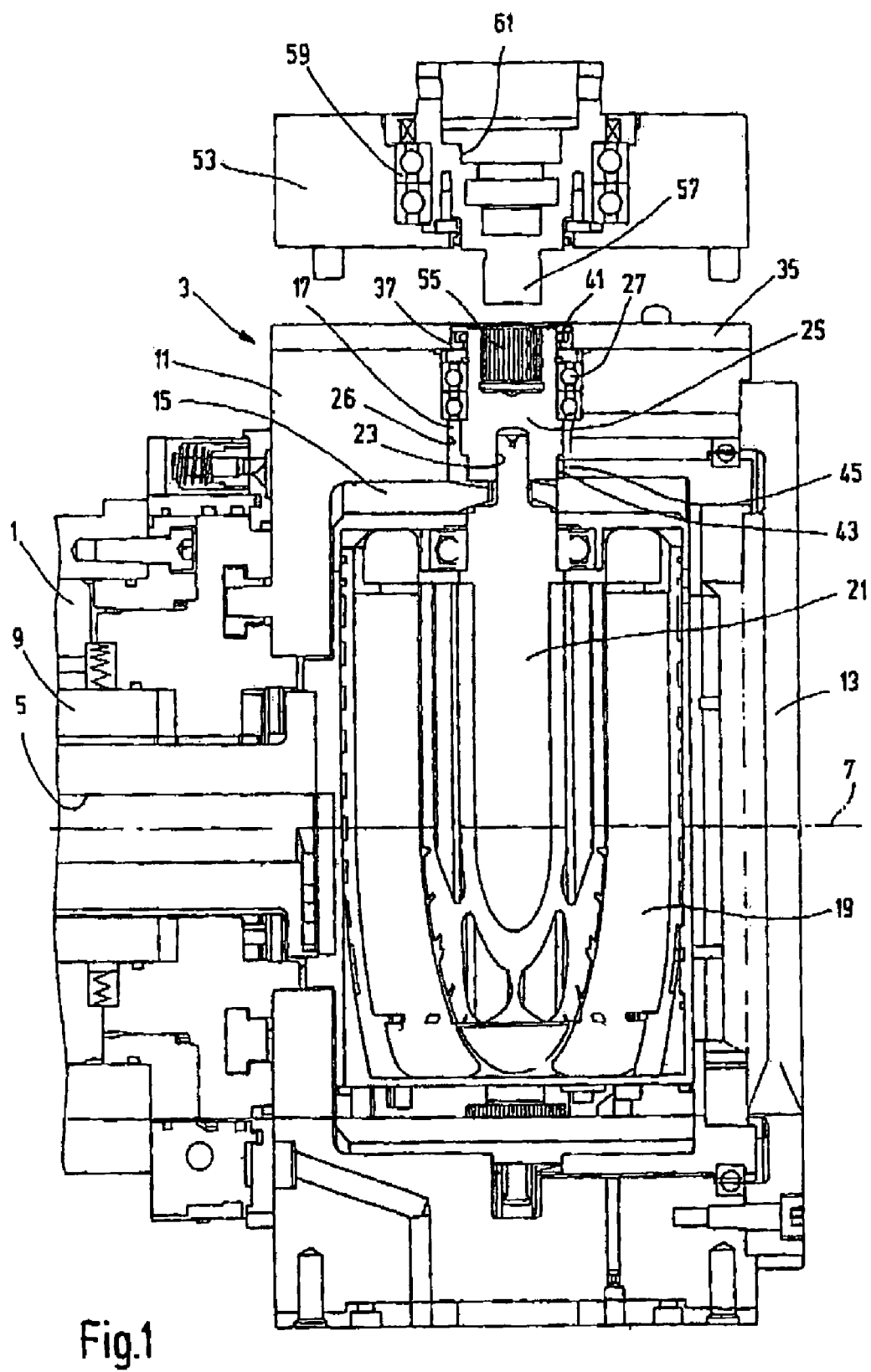
FIG. 1. is a side elevational view in section of a tool disk of a tool revolver according to an exemplary embodiment of the invention, located on a base body shown in cutaway, in which a tool station oriented towards the working position as well as a conventional tool receptacle to be installed in this tool station (before the installation and without the machining tool located therein) is shown.

In a cutaway view, FIG. 1 shows only an end area of a base body 1 connectable to a tool machine (not shown) and mounted on a tool disk 3. The base body 1 has a central, stationary hollow shaft 5 defining a revolver axis 7 around which the tool disk 3 can rotate. The drive for the rotary motion around the revolver axis 7 is effected by a tool disk drive, not shown in greater detail, via a drive pipe 9 that surrounds the hollow shaft 5. In particular, the respective rotary motion is embodied in the form of a rotary actuator.

The tool disk 3 has a wheel head housing 11, which, together with a front-side cover plate 13 bolted to the housing 11, encloses an inner space 15 in the tool disk housing 11.

Figure 2:
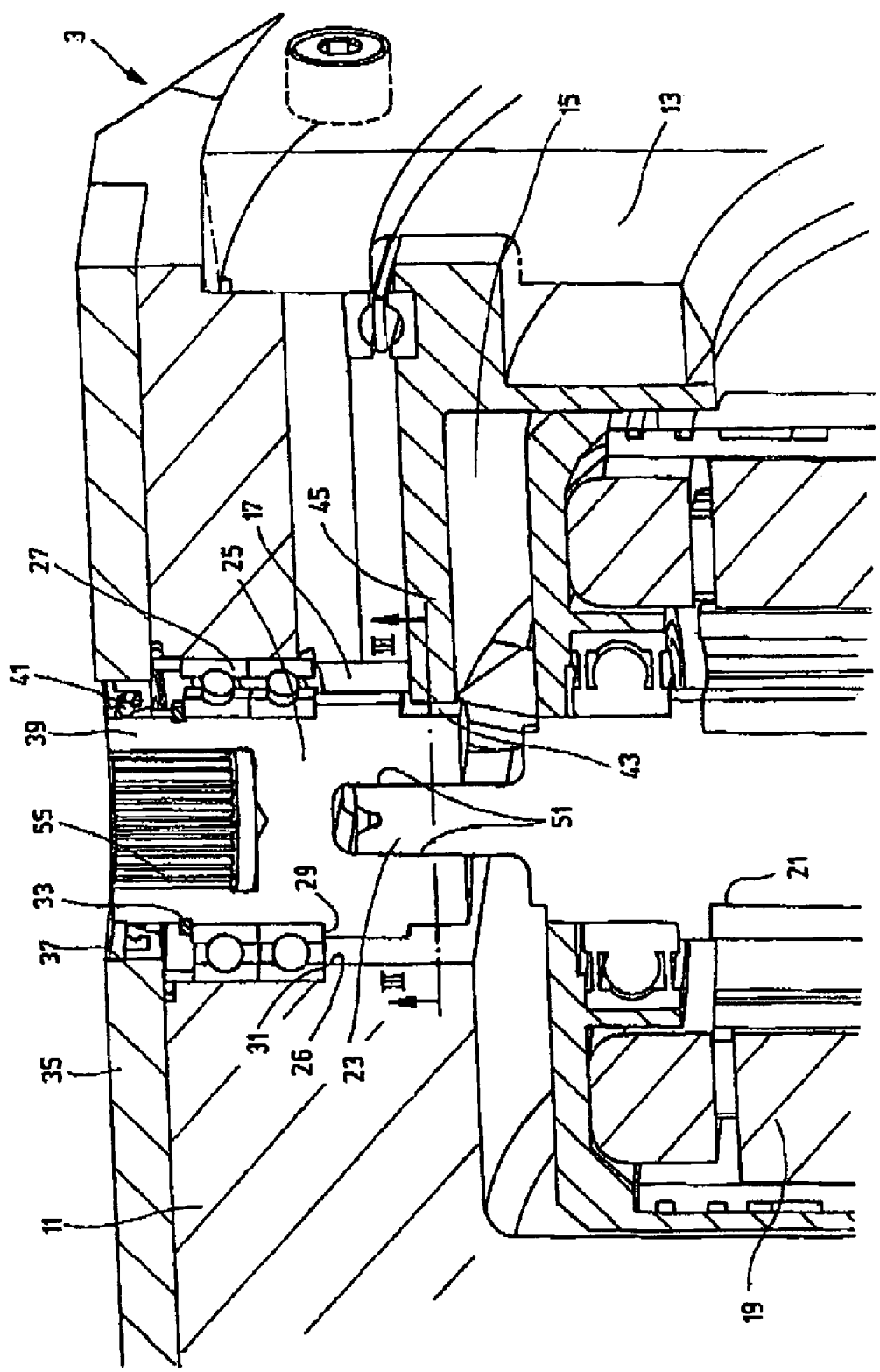
FIG. 2 is a partial perspective view in section only of the area of the tool station of FIG. 1 that is in the working position, with the said view shown enlarged compared to FIG. 1 and diagrammatically simplified.

On its periphery, the tool disk 3 has a plurality of tool stations 17 arranged at the same angular distances from one another and relative to the revolver axis 7, having a radial orientation. FIGS. 1 and 2 show that one of the tool stations 17 is adjusted to the working position, in which a tool drive located in the inner space 15 of the tool disk 3 can drive a machining tool mounted on the tool station in the working position via its drive-side coupling part. In this example, the tool drive has an electric motor 19 located in the inner space 15 and rigidly connected to the base body 1 via the hollow shaft 5. The axis of rotation of its rotor shaft 21 is coaxial to the tool station 17 set in the working position. As a drive-side coupling part, the rotor shaft 21 in its end section forms a drive pin 23, which, see FIG. 3, has a rectangular cross section. As a tool-side coupling part that interacts with the drive-side coupling part, a drive part 25 is provided in each tool station 17. Each drive part 25 is rotatably mounted in a respective through opening 26 of the tool disk housing 11, which extends into the disk housing in the radial direction, namely by a roller bearing 27 located on a circular-cylindrical peripheral section of the drive part 25.

As seen most clearly from FIG. 2, the interior wall of the through opening 26 and the circular-cylindrical peripheral section of the drive part 25 are stepped in each case. Shoulder areas 31 or 29 are then formed on which the roller bearing 27 in interaction with a safety ring 33, sitting in a peripheral groove of the drive part 25 (FIG. 2), axially securing the drive part 25.

In the area of each tool station 17 on the exterior of the tool disk 3, a breech plate 35 with an opening 37 extends concentric to the respective tool station 17 and at the outer end in the radial direction. The diameter of this opening 37 is larger than the outer diameter of the circular-cylindrical end section 39 of the drive part 25 that extends into this opening 37. In the thus formed intermediate space, a shaft seal is arranged, which, in this case, is a radial shaft seal 41. As seen from FIGS. 1-2, the opening 37 of the outer or breech plate 35 relative to the drive part 25 is thus sealed at each tool station 17. In turn, a seal between the inner space 15 of the tool disk 3 and the exterior is then provided at each tool station 17.

Figure 3:
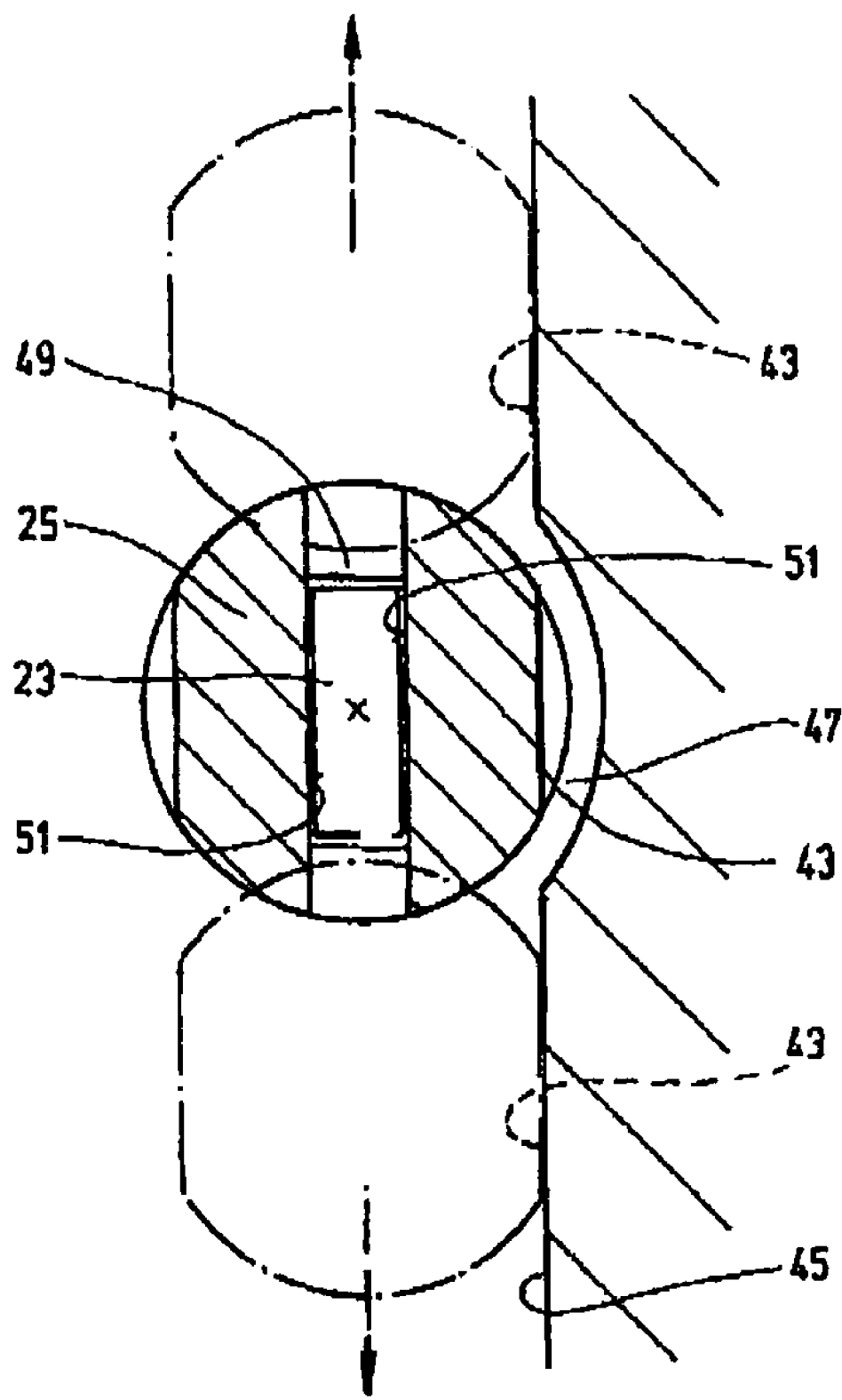
FIG. 3 is a schematic representation of the mode of operation of an anti-rotation device based on a sectional view corresponding to the line III-III of FIG. 2.

As can be seen most clearly from FIGS. 2 and 3, flat areas 43 that connect to the circular-cylindrical peripheral section and that form a respective flat bearing surface each, which are part of an anti-rotation device for the respective drive part 25, are found on the radial inner end area of each drive part 25. This respective bearing surface on the flat areas 43 is guided along a guide element 45 in the rotary motion of the tool disk 3 This guide element 45 forms a path of travel between the tool stations 17 that is interrupted only in the area 47 (FIG. 3) at least one tool station 17. On that tool station 17, the drive parts 25 are guided with the bearing surface formed adjacent to the flat areas 43 as the tool disk 3 rotates, and thus, are secured against rotation.

To facilitate this course of operation, the electric motor 19 has a device for determining the rotational position of the rotor shaft 21 and accordingly the drive pin 23. The respective drive part 25, before it is moved out from the working position by the rotation of the tool disk 3 then assumes the rotational position shown in FIG. 3, in which the flat areas 43 align with the path of travel on the guide element 45.

In addition, as seen clearly from FIG. 3, a diametrical through groove 49 is open on the end side with parallel side walls 51 forming planes parallel to the flat areas 43. The drive pin 23 is suitably accommodated between side walls 51 and is located in the drive element 25. Operating in conjunction, these measures ensure that in the rotary motion of the tool disk 3 around the revolver axis 7, the drive pin 23 can reliably engage with and disengage from the groove 49 in the drive part 25 of each respective tool station 17. As a drive motor, a commercially available electric servo motor can be used. With smaller overall size of the tool revolver, an angular gear with an electric motor can also be provided, which can be located outside of the tool disk 3 (not shown).

As FIGS. 1 and 2 show, the drive part 25 has a seat 55 that is open on the outer periphery of the tool disk 3 at the radially outer end to form the drive connection with a tool receptacle 53 that is to be operated at the corresponding tool station. The seat 55 has an inner axial driver toothed wheel work of conventional design with which a complementary toothed drive shaft 57 of the tool receptacle 53 that can be installed at the suitable tool station 17 can engage. In this case, FIG. 1 shows a tool receptacle 53 of conventional design (HSK type) without the machining tool that is used in the tool receptacle 53 and before the outer breech plate 35 is installed at the tool station 17 (for example by bolting). As FIG. 1 shows, in the case of such a tool receptacle 53, the drive shaft 57 is designed in the form of a body of rotation, which is mounted on the tool receptacle 53 by roller bearings 59 and has a stepped interior hollow 61 as a seat for the tool holding device of the actual machining tool.

While one embodiment has been chosen to illustrate the invention, it will be understood by those skilled in the art that various changes and modifications can be made therein without departing from the scope of the invention as defined in the appended claims.

What is claimed is:
1. A tool revolver, comprising:
a base body mountable on a tool machine and defining a revolver axis;
a tool disk rotatably mounted on said base body about said revolver axis and having a tool disk periphery;
a plurality of tool stations distributed on said tool disk periphery and being adjustable to at least one working position by rotation of said tool disk about said revolver axis;
a tool drive located inside of said tool disk and mounted on said base body, said tool drive including a drive-side coupling part coupled to a tool-side drive part for driving a tool located at a tool station oriented towards said at least one working position;

a drive part forming said tool-side drive part in each of said tool stations and being rotatably mounted relative to said tool disk;

a tool receptacle of a respective tool being operable and brought into a driving position at the respective tool station with the respective drive part; and a sealing arrangement sealing an interior of said tool disk against an exterior of said tool disk at each of said tool stations and being on a peripheral surface of each of said drive parts.

2. A tool revolver according to claim 1 wherein each of said drive parts is a rotatably mounted drive part, is rotatably mounted on a rotational axis, has a circular-cylindrical periphery over a majority of an axial length thereof, and has at least one flat bearing surface in a peripheral section thereof on an end side thereof adjacent to said drive-side coupling part of said tool drive; and each said at least one bearing surface forms a component of an anti-rotation device securing a rotational position of the respective drive part relative to the respective rotational axis as said tool disk rotates about said revolver axis.

3. A tool revolver according to claim 2 wherein each of said sealing arrangements is provided on an end area, adjacent to said tool disk periphery, of the respective circular-cylindrical periphery of the respective drive part.

4. A tool revolver according to claim 2 wherein a diametrical through groove opens on an end of each said drive part facing said interior of said tool disk, each said groove having flat side walls forming planes parallel to said at least one bearing surface to provide a tool-side coupling part for coupling with said drive-side coupling part.

5. A tool revolver according to claim 4 wherein said drive-side coupling part of said tool drive comprises at least one drive pin with a rectangular cross section accommodated in said groove of said drive part of the tool station oriented towards said at least one working position and movable through said groove during rotary motions of said tool disk about said revolver axis.

6. A tool revolver according to claim 5 wherein each said anti-rotation device has a guide element forming a path of travel extending concentrically to said revolver axis between said tool stations; and said path of travel extends along a path of travel traversed by the respective drive part as said tool disk rotates about said revolver axis, and extends along a guided path of said at least one bearing surface of the respective drive part as said tool disk rotates about said revolver axis.

7. A tool revolver according to claim 6 wherein said drive-side coupling part of said tool drive is rotatably positioned with said at least one drive pin bringing the respective drive part into a rotational position in which said side walls of the respective groove and the respective at least one bearing surface of the respective drive part are in planes parallel to the path of travel traversed by the respective drive part.

8. A tool revolver according to claim 7 wherein said tool drive comprises an electric motor with a rotor shaft concentric with the drive part of each respective tool station when the respective tool station is located in said at least one working position, said rotor shaft forming said at least one drive pin at an end thereof.

9. A tool revolver according to claim 8 wherein said electric motor permits determination of a rotational position of said rotor shaft.

10. A tool revolver according to claim 1 wherein each said drive part comprises a seat having rotary driver elements and being open to said tool disk periphery to form the driving connections with said tool receptacle of the tool to be operated at the corresponding tool station; and a drive shaft of the corresponding tool receptacle is insertable into the corresponding seat.

11. A tool revolver according to claim 10 wherein the respective tool receptacle has a tool support body boltable and installable on said tool disk periphery; and in said tool support body, the respective drive shaft has a part forming a seat for forming a drive connection between the respective drive shaft of the respective tool receptacle and associated tool and is rotatably mounted.

* * * * *